Dec. 27, 1927.

H. A. SANGREN

OPHTHALMIC MOUNTING

Filed March 1, 1926

1,654,054

Inventor

Harry A. Sangren.

By Harry H. Styll
Attorney

Patented Dec. 27, 1927.

1,654,054

UNITED STATES PATENT OFFICE.

HARRY A. SANGREN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed March 1, 1926. Serial No. 91,464.

This invention relates to improvements in ophthalmic mountings and has particular reference to an improved bridge and guard construction for the same.

The principal object of the invention is to provide means by which the distance between the pupils of the eyes may be adjusted without changing or altering the adjustment of the guards and to provide means by which the guards may be independently adjusted without interfering with the adjustment of the bridge.

Another object of the invention is to provide an ophthalmic mounting having a bridge with adjustable loops and guard arms with independent adjustable loops.

Other objects of the invention will become apparent from the following description taken in connection with the accompanying drawing, in which the preferred form only of the invention is shown by way of illustration, it being apparent that slight changes may be made in the construction or arrangement of parts without departing from the spirit of the invention as expressed in the appended claims. I, therefore, do not wish to be limited to the exact details and arrangements shown.

In the accompanying drawings in which similar characters are used to denote corresponding parts throughout:

Figure 1:
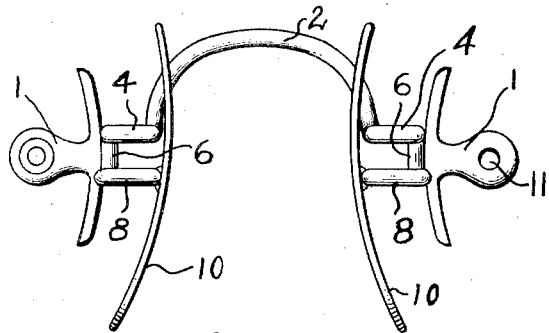
Figure 1 is an elevation of the mounting from the guard or rear side thereof showing the bridge and guard connections and the attaching clips for the lenses.
Figure 2:
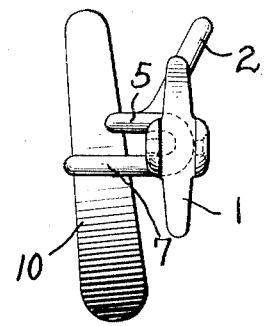
Figure 2 is a side elevation or end view of Figure 1.
Figure 3:
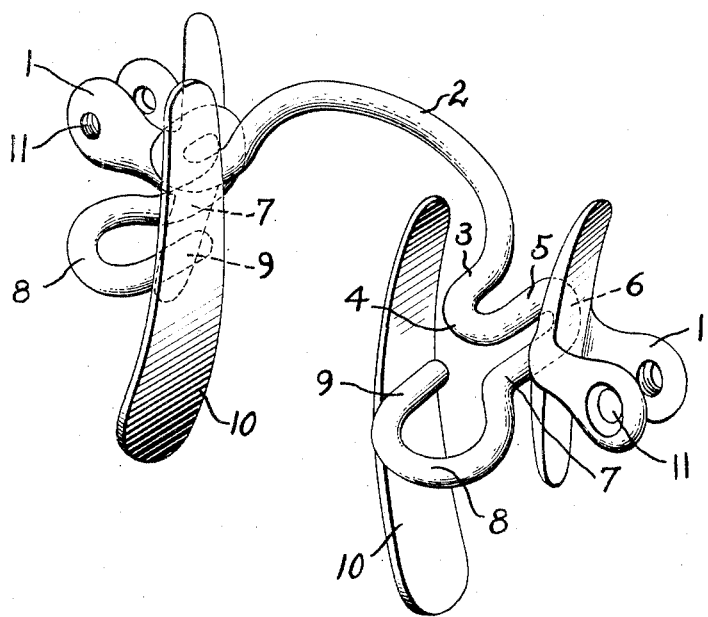
Figure 3 is an enlarged perspective view.

In the fitting of eyeglasses and spectacles it has been found that there is almost an endless variety of facial characteristics to be encountered. In the first place the distance between the pupils of the eyes varies in almost every individual case, and in the second place the shape and size of noses are different. Again, the face of a single individual may not be symmetrical; the nose may be wider on one side than the other, one eye may be further away from the center of the nose than the other. These varying facial characteristics have made it extremely difficult to adjust a mounting to any one individual so that the glasses will stay in place in the proper position before the eyes. It has further been found that the types of adjustment necessary may be divided into two classes, namely, adjustments of the bridge to center the lenses properly before each eye, which are commonly known as adjustments for the pupillary distance, and adjustments to position the guards or nose clamps on the nose in, out, up or down, so that the lenses will be retained in proper position before the eyes.

In my present invention I have provided independent means for making these two classes of adjustments as set forth hereinafter.

Referring to the drawings, the lenses (not shown) are held in the lens clamps 1 in the usual manner. The lens clamps 1 are connected by the bridge 2; at each end of the bridge 2 adjacent its connection to the lens clamps 1 is a loop or bend. This loop or bend has a rearwardly extending portion 3 extending towards the face, a turn 4, and a forwardly projecting portion 5, and a downwardly projecting portion 6, which downwardly projecting portion is connected by solder or otherwise to the lens clamp 1. The downwardly projecting portion 6 is then bent into a rearwardly extending portion 7 having a loop or turn 8 and a forwardly extending portion 9 to which is secured the nose guard 10.

It will be noted that the two loop portions 4 and 8 lie in a horizontal plane one above the other in the initial position or adjustment of the parts, it being understood, of course, that the purposes of the loops 4 and 8 are for adjustment by bending so that these two loops may be deflected from their original positions when adjusted, as described hereinafter.

In adjusting the mounting to the face the bridge loops 4 are first adjusted by bending to the correct pupillary distance of the patient. The nose guards 10 are then positioned on the nose by bending the loops 8. It will be noted that by bending the loop 8 the nose guard may be angled as desired. It will also be noted that the adjustment of the loops 4 can be made independent of the adjustment of the loops 8, and that the loops 4 may be adjusted without altering the position of the nose guard 10 and the loops 8 may be adjusted without changing the adjustment of the bridge. The lenses are secured in the clamps 1 by the usual lens holding screws passing through the orifices 11.

It is also apparent that many different types of nose guards may be used. These nose guards may be rigidly secured to the arms 9 by soldering or may be pivoted thereon if a rocking guard is desired.

From the foregoing description it will be seen that I have provided simple, efficient and inexpensive means for providing an ophthalmic mounting with adjustments that will permit the mounting to be adjusted to the various facial requirements of the individual including the pupillary distance, the shape of the nose, etc.

Having described my invention, I claim:

1. In a device of the character described, a pair of lens clamps, a bridge connecting the lens clamps having a central portion and bent portions adjacent each lens clamp, said bent portions comprising a rearwardly extending portion from the central portion of the bridge, a turn, a forwardly extending portion, a downwardly extending portion, a rearwardly extending portion, a turn, and a forwardly extending portion, and nose guards on the second forwardly extending portions.

2. In a device of the character described, a pair of lens clamps, a bridge connecting the lens clamps having a central portion and bent portions adjacent each lens clamp, said bent portions comprising a rearwardly extending portion from the central portion of the bridge, a turn, a forwardly extending portion, a downwardly extending portion secured to the lens clamp, a rearwardly extending portion, a turn and a forwardly extending portion, and nose guards on the second forwardly extending portions.

3. In a device of the character described in combination with means for holding a pair of lenses, a bridge member connecting the lens holding means comprising a central bridge portion the terminal portions of which extend rearwardly then forwardly then downwardly where they are connected to the lens holding means, then rearwardly and then forwardly and nose guards secured to the last named forwardly extending portions.

4. In a device of the character described in combination with means for holding a pair of lenses, a bridge member connecting the lens holding means comprising a central bridge portion the terminal portions of which comprise two loops one above the other, both loops extending rearwardly and then forwardly in substantially a horizontal plane being connected by a portion in the vertical plane which is connected to the lens holding means, and nose guards secured to the forwardly extending portions of the lower loop.

HARRY A. SANGREN.